United States Patent
Stammberger et al.

(10) Patent No.: US 10,821,387 B2
(45) Date of Patent: **\*Nov. 3, 2020**

(54) APPARATUS FOR ADDITIVE MANUFACTURING OF THREE-DIMENSIONAL OBJECTS

(71) Applicant: CL SCHUTZRECHTSVERWALTUNGS GMBH, Lichtenfels (DE)

(72) Inventors: Jens Stammberger, Rödental (DE); Christian Diller, Lichtenfels (DE); Ralf Hetzel, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,417

(22) Filed: Nov. 14, 2017

(65) Prior Publication Data
US 2018/0133637 A1   May 17, 2018

(30) Foreign Application Priority Data
Nov. 14, 2016 (DE) .................. 10 2016 121 783

(51) Int. Cl.
*B01D 46/00* (2006.01)
*B29C 64/153* (2017.01)
(Continued)

(52) U.S. Cl.
CPC ..... *B01D 46/0017* (2013.01); *B01D 46/0013* (2013.01); *B22F 3/1055* (2013.01);
(Continued)

(58) Field of Classification Search
CPC ........ B01D 46/04; B01D 46/00; B01D 46/44; B01D 46/0058; B01D 46/0086;
(Continued)

(56) References Cited

U.S. PATENT DOCUMENTS 4,336,043 A * 6/1982 Aonuma ............ B01D 46/0012
210/259
8,794,263 B2   8/2014 Scott et al.
(Continued)

FOREIGN PATENT DOCUMENTS

| CN | 102186554 B | 1/2014 |
|---|---|---|
| CN | 103781527 B | 8/2016 |

(Continued)

OTHER PUBLICATIONS

German Office Action No. 1020161217832.
European Search Report 17177216 dated Feb. 20, 2018.

*Primary Examiner* — Jacob T Minskey
*Assistant Examiner* — Cedrick S Williams
(74) *Attorney, Agent, or Firm* — Dority & Manning, P.A.

(57) ABSTRACT

An apparatus (1) for additive manufacturing of three-dimensional objects (2) by successive, selective layer-by-layer exposure and thus successive, selective layer-by-layer solidification of construction material layers of construction material (3) that can be solidified by means of an energy beam, comprising a pipe structure (12), and a filter device (7) that is connected to the pipe structure (12), provided for filtering the process gas (9), wherein the filter device (7) comprises several filter modules (14) that can be or are arranged exchangeably connected to the pipe structure (12).

19 Claims, 2 Drawing Sheets

Figure 1:
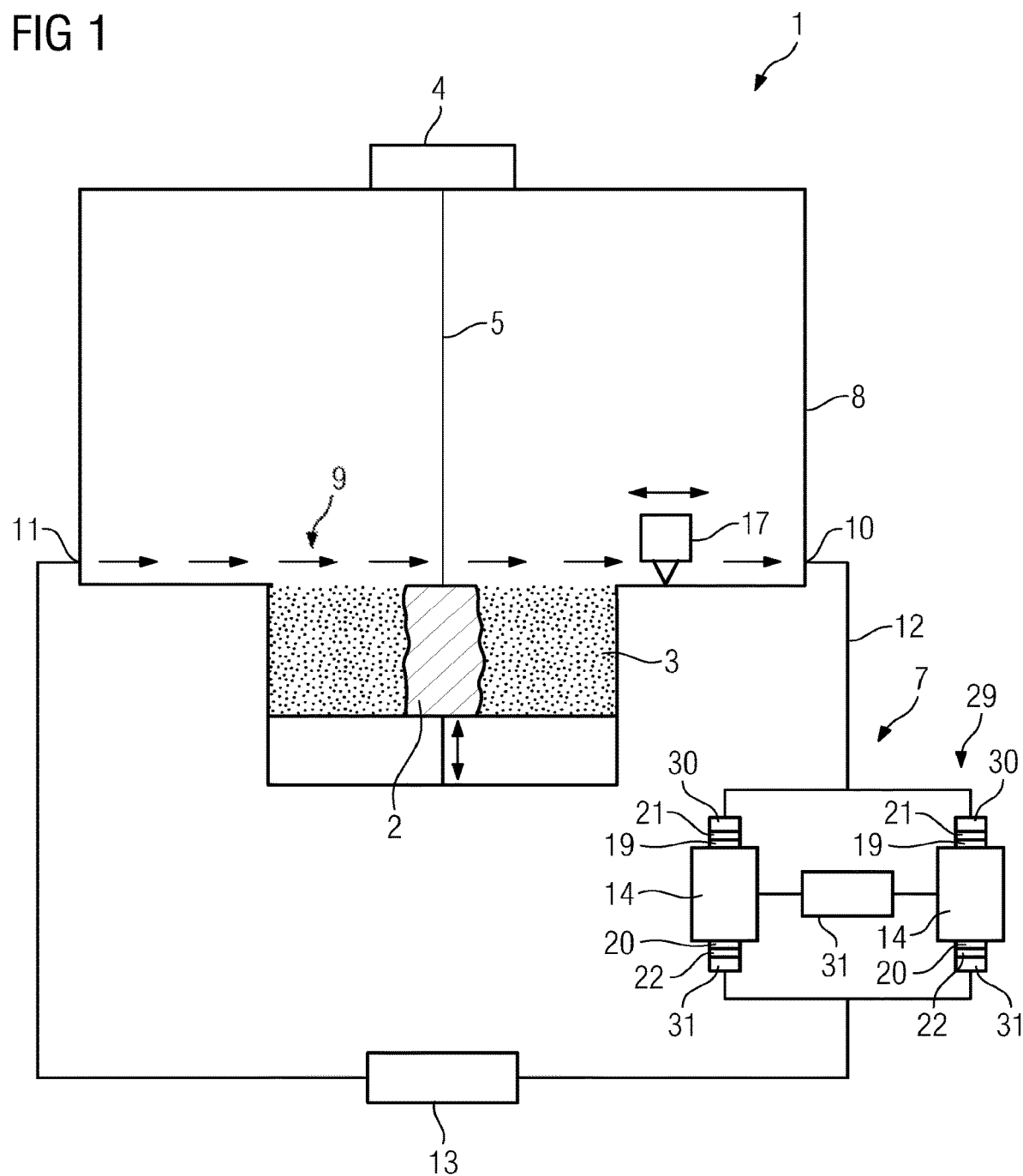

(51) Int. Cl.
*B22F 3/105* (2006.01)
*B33Y 10/00* (2015.01)
*B33Y 30/00* (2015.01)
*B29C 64/35* (2017.01)
*B29C 64/364* (2017.01)
*B29C 64/268* (2017.01)
*B29C 64/371* (2017.01)
*B33Y 50/02* (2015.01)

(52) U.S. Cl.
CPC ............ *B29C 64/153* (2017.08); *B29C 64/35* (2017.08); *B29C 64/364* (2017.08); *B33Y 10/00* (2014.12); *B33Y 30/00* (2014.12); *B29C 64/268* (2017.08); *B29C 64/371* (2017.08); *B33Y 50/02* (2014.12)

(58) Field of Classification Search
CPC ............ B01D 46/0091; B01D 46/0093; B01D 46/0068; B01D 46/24; B29C 64/371; B29C 64/35; B29C 64/153; B29C 64/364
See application file for complete search history.

(56) References Cited

U.S. PATENT DOCUMENTS

| | | | |
|---|---|---|---|
| 10,265,772 B2 | 4/2019 | Mironets et al. | |
| 2010/0017148 A1* | 1/2010 | Bos | B01D 46/0086 702/24 |
| 2013/0025246 A1* | 1/2013 | Burns | B01D 46/2403 55/498 |
| 2016/0207147 A1 | 7/2016 | Van Hassel | |
| 2018/0244034 A1 | 8/2018 | Sutcliffe et al. | |
| 2019/0001413 A1* | 1/2019 | Golz | B29C 64/153 |
| 2019/0022946 A1* | 1/2019 | Jones | B22F 3/008 |

FOREIGN PATENT DOCUMENTS

| | | |
|---|---|---|
| CN | 105920927 A | 9/2016 |
| CN | 105920927 A | 9/2016 |
| DE | 202012013036 | 8/2014 |
| DE | 202012013036 U1 | 9/2014 |
| DE | 102014207160 A1 | 10/2015 |
| DE | 102014207160 A1 | 10/2015 |
| JP | S5058500 A | 5/1975 |
| JP | S5895537 A | 6/1983 |
| JP | H07100311 A | 4/1995 |
| JP | 2007330969 A | 12/2007 |
| JP | 2012501828 A | 1/2012 |
| WO | 2010026396 A2 | 3/2010 |
| WO | WO2010026396 A2 | 3/2010 |
| WO | 2014164807 A1 | 10/2014 |
| WO | WO2014164807 A1 | 10/2014 |
| WO | 2016079494 A2 | 5/2016 |
| WO | WO2016079494 A2 | 5/2016 |
| WO | WO-2016079494 A2 * | 5/2016 ............ B33Y 10/00 |

* cited by examiner

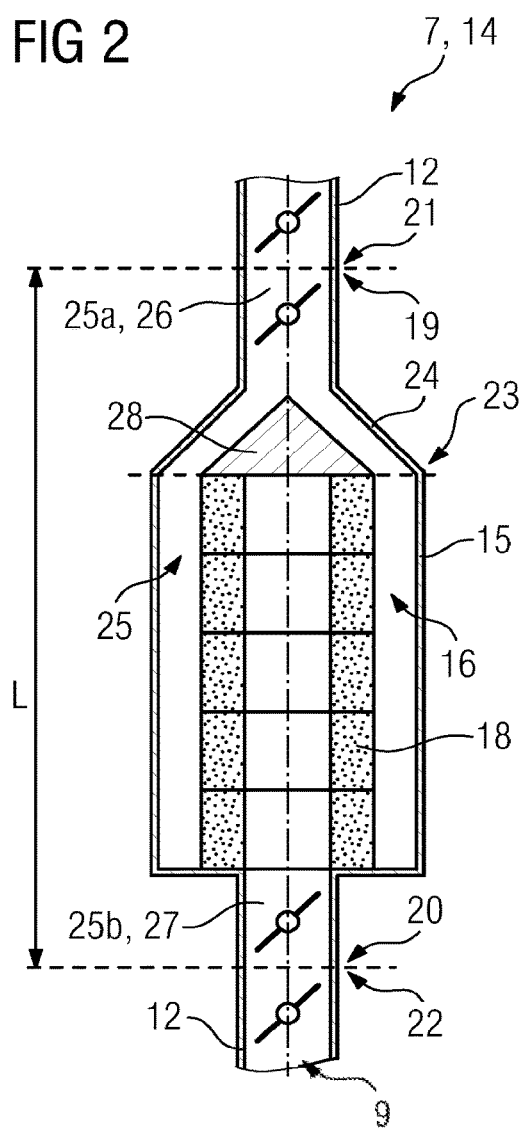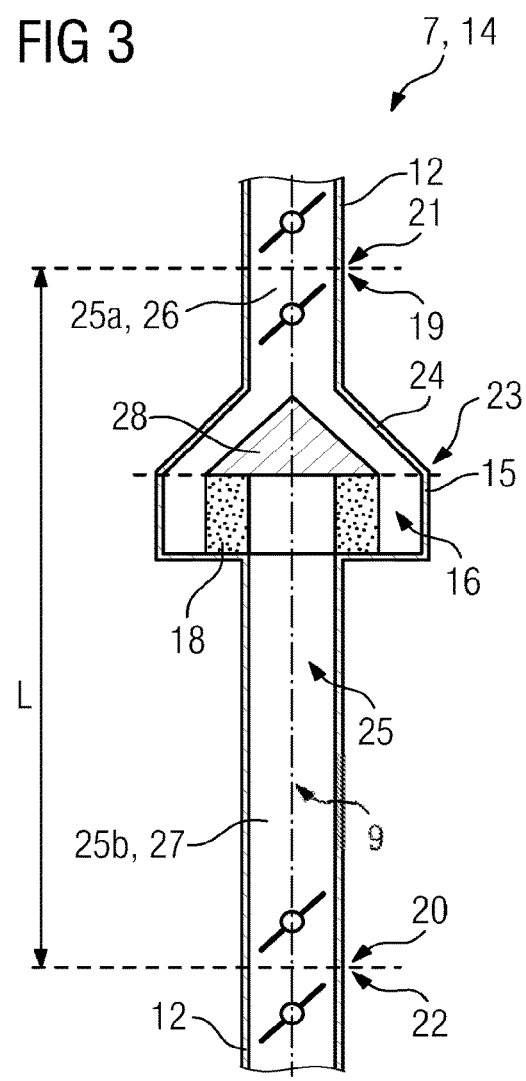

APPARATUS FOR ADDITIVE MANUFACTURING OF THREE-DIMENSIONAL OBJECTS

CROSS-REFERENCE TO RELATED APPLICATIONS

This application claims priority to German Patent Application serial no. 10 2016 121 783.2 filed Nov. 14, 2016, the contents of which is incorporated herein by reference in its entirety as if set forth verbatim.

The invention relates to an apparatus for additive manufacturing of three-dimensional objects by successive, selective layer-by-layer exposure and thus successive, selective layer-by-layer solidification of construction material layers of construction material that can be solidified by means of an energy beam, comprising the other features of the preamble of claim 1.

Respective apparatuses for additive manufacturing of three-dimensional objects are basically known, for example, in the form of apparatuses for performing selective laser sintering methods or selective laser melting methods.

Respective apparatuses typically comprise a pipe structure that comprises at least one, especially tubular, pipe element and a filter device connected to the pipe structure. The pipe structure can be flown through by process gas arising in the course of performing additive construction processes in a process chamber of the apparatus, especially containing impurities arising related to the process. The filter device is provided for filtering the process gas.

To date, operation of respective apparatuses must be interrupted when the filter device is stopped temporarily, e.g., when reaching the state of saturation of a filter module associated with the filter device, to exchange a respective filter module. Operating the apparatus, i.e., performing additive construction processes, is only possible if operating the filter device is possible as well.

Especially with regard to efficient continuous performance of additive construction processes, this is a condition that needs improvement.

The invention is based on the object to provide, especially with regard to efficient continuous performance of additive construction processes, an improved apparatus for additive manufacturing of three-dimensional objects.

The object is solved by an apparatus according to claim 1. The dependent claims relate to possible embodiments of the apparatus.

The apparatus described herein ("apparatus") is provided for additive manufacturing of three-dimensional objects, i.e., for example, technical components or technical component groups, by successive, selective layer-by-layer exposure and thus successive, selective layer-by-layer solidification of construction material layers of construction material that can be solidified. The construction material can be particulate or powdered metal, plastic, and/or ceramic material. The selective solidification of respective construction material layers to be solidified selectively is performed based on object-related construction data. Respective construction data describe the geometric structural design of the respective object to be manufactured additively and can contain, for example, "sliced" CAD data of the object to be manufactured additively. The apparatus can be formed as an SLM apparatus, i.e., as an apparatus for performing selective laser melting methods (SLM methods), or as an SLS apparatus, i.e., as an apparatus for performing selective laser sintering methods (SLS methods).

The apparatus comprises the functional components typically required to perform additive construction processes, including especially a coating device provided for forming construction material layers to be solidified selectively (in the construction plane of the apparatus) and an exposure device provided for selectively exposing construction material layers to be solidified selectively (in the construction plane of the apparatus). The coating device typically comprises several components, i.e., for example, a coating element that comprises an, especially blade-shaped, coating tool and a guiding device for guiding the coating element along a defined movement path. The exposure device typically comprises several components as well, i.e., for example, a beam generation device for generating an energy or laser beam, a beam deflection device (scanner device) for deflecting an energy or laser beam generated by the beam generation device onto an area to be exposed of a construction material layer to be solidified selectively, and diverse optical elements such as lens elements, objective elements, etc.

The mentioned functional components of the apparatus are typically arranged or formed on or in a process chamber of the apparatus that can typically be rendered inert.

The apparatus comprises a pipe or tube structure ("pipe structure") that comprises at least one, especially tubular, pipe element, which can be or is flown through by process gas arising in the course of performing additive construction processes in a process chamber of the apparatus, especially containing impurities arising related to the process. Respective impurities in the process gas or in the process gas flow flowing through the pipe structure are especially smoke or smoulder particles arising related to the process and/or non-solidified construction material particles ("weld spatters"). The pipe structure is typically connected via a pipe element (section) to an outflow section of the process chamber, especially comprising an outflow opening, via which process gas (to be filtered) can flow from the process chamber into the pipe structure, and via another pipe element (section) to an inflow section of the process chamber, especially comprising an inflow opening, via which (filtered) process gas can flow from the pipe structure into the process chamber.

The apparatus furthermore comprises a filter device connected to the pipe structure, provided for filtering the process gas arising in the course of performing additive construction processes in a process chamber of the apparatus, especially containing impurities arising related to the process. Filtering the process gas is understood to mean removing respective impurities from the process gas. Respective impurities in process gas to be filtered are, as mentioned, especially smoke or smoulder particles arising related to the process and/or non-solidified construction material particles ("weld spatters").

The filter device comprises several, i.e., at least two, filter modules. Every filter module comprises a filter module housing. Every filter module housing comprises an inflow section forming an inflow side and an outflow section forming an outflow side and a filter body receiving room configured with a defined geometry arranged or formed between the inflow section and the outflow section. As shown in the following, the filter body receiving room can be provided for receiving (only) a defined number of filter bodies configured with a defined geometry. Regardless of its geometrical configuration, a filter body is formed of or at last comprises, e.g., fabric-like, porous, or cellular filter material.

Advantageously, a respective filter module forms a preconfigurable or preconfigured assembly group that can be handled separately. The handling of respective filter modules is hence facilitated, filter modules can be handled smoothly, especially also automatably or automatedly, e.g., in connection with an exchange or replacement.

The filter modules can be or are arranged exchangeably connected to the pipe structure (if required). The filter modules can therefore be arranged in the pipe structure such that they are connected to the pipe structure. A filter module that is arranged connected to the pipe structure can be flown through by the process gas flowing through the pipe structure. A filter module that is arranged connected to the pipe structure generally allows for filtering the process gas.

Respective filter modules arranged connected to the pipe structure can be switched separately, i.e., individually or in groups or collectively, via a switching device assigned to the filter device to a respective operating state in which a respective filter module is connected to the pipe structure such that it can be flown through by the process gas, and to a respective nonoperating state in which a respective filter module is connected to the pipe structure such that it cannot be flown through by the process gas. Hence, the switching device comprises several, i.e., at least two, switch positions via which respective operating or nonoperating states of respective filter modules can be implemented; therefore, respective switch positions are assigned to respective operating or nonoperating states of respective filter modules. Respective switch positions of the switching device can be realized, for example, such that the process gas flowing through the pipe structure flows in a first exemplary switch position of the switching device through only one single filter module arranged connected to the pipe structure and in a second exemplary switch position of the switching device through at least two, possibly all, filter modules arranged connected to the pipe structure. Actual filtering of the process gas is only possible with at least one filter module arranged connected to the pipe structure and switched to an operating state.

The option of individual switching of the filter modules to respective operating and nonoperating states allows operation of the filter device even while exchanging single filter modules, i.e., especially filter modules with restricted filter capacity, e.g., due to a state of saturation, or in the case of failure of single filter modules. In this case, filtering of the process gas is ensured by at least one further filter module arranged connected to the pipe structure and switched to an operating state. To exchange a filter module, it has to be switched to a nonoperating state via the switching device. The filter module that is switched to the nonoperating state is decoupled from the process gas flow flowing through the pipe structure and can be easily removed from its arrangement connected to the pipe structure.

Thus, operation of the apparatus does not need to be interrupted when a filter module is (to be) exchanged, e.g., when reaching a state of saturation. Basically, a filter module can even be exchanged during operation of the apparatus, i.e., while performing an additive construction process. Thus, especially with regard to efficient continuous performance of additive construction processes, an improved apparatus for additive manufacturing of three-dimensional objects is provided.

The switching device can be formed as or comprise a valve device that comprises several valve units. The valve units of the valve device, which can typically be controlled separately via a control device associated with the switching device, can be or are each assigned to a filter module arranged connected to the pipe structure. Every valve unit can be brought to a first switch position in which a filter module assigned to the respective valve unit can be flown through by the process gas, and to a second switch position in which a filter module assigned to the respective valve unit cannot be flown through by the process gas. The switch positions of a valve unit are hence correlated with the operating or nonoperating state of a filter module assigned to the valve unit; the switch positions of the valve unit are hence assigned to the operating or nonoperating state of the filter module. The switch positions of the switching device can hence be implemented via respective switch positions of the valve units associated with the valve device. Respective valve units can be formed as or comprise, e.g., directional valves.

The pipe structure can comprise a connection device that comprises several connection interfaces, wherein respective filter modules can be arranged connected to the pipe structure via a respective connection interface. A respective connection interface can hence be provided for arranging a filter module connected to the pipe structure. Every connection interface is typically assigned a valve unit; therefore, every connection interface is typically equipped with a valve unit.

A respective filter module comprises connection interfaces as well, via which it can be or is connected to respective connection interfaces of the connection device of the pipe structure if required. The connection interfaces of the pipe structure can comprise, e.g., connecting pieces comprising flange areas. The connection interfaces on the filter module, too, can comprise, e.g., connecting pieces comprising flange areas. The connection interfaces of both the pipe structure and the filter module are advantageously configured identically; this facilitates any required replacement or, as explained further below, exchange of respective filter modules.

Respective connection interfaces of the pipe structure or filter module can comprise suitable fastening and sealing elements. As mentioned, the connection interfaces can be formed as connecting pieces comprising flange areas. Respective connecting pieces or flange areas typically comprise fastening and sealing elements. Respective fastening elements can be provided for fastening a filter module in a firm stabilized position to the connection interfaces of the pipe structure. A respective fastening element can allow form-locked and/or force-locked fastening of a filter module to a connection interface of the pipe structure. A fastening element allowing form-locked and/or force-locked fastening of a filter module to a connection interface of the pipe structure can be, e.g., a fastening or clamping clip. Respective fastening elements can therefore be or comprise, e.g., subring-type or full ring-type or -shaped fastening or clamping clips. Respective sealing elements can be or comprise, e.g., sealing rings.

The apparatus can comprise a detection device assigned to the filter device, provided for, especially automatable or automated, detection of saturation information describing a current and/or future degree of saturation of at least one filter module that is arranged connected to the pipe structure. It is thus possible via the detection device to detect a current and/or future degree of saturation of a filter module so that a possibly required exchange of a filter module can be performed early or timely.

The saturation information can describe a parameter dependent on the degree of saturation describing the degree or state of saturation of a filter module. A respective parameter can be, e.g., the weight of the filter module dependent on the degree of saturation or a change in weight of the filter module dependent on the degree of saturation, the pressure of the process gas dependent on the degree of saturation or the differential pressure (pressure difference) of the process gas dependent on the degree of saturation between an inflow section of a filter module forming an inflow side and an outflow section of the filter module forming an outflow side, the flow rate of the process gas dependent on the degree of saturation, especially compared to the capacity of a flow generation device generating the process gas flow, especially a pump device, through a filter module or the flow rate difference dependent on the degree of saturation between an inflow section forming an inflow side and an outflow section forming an outflow side of the filter module, or the composition dependent on the degree of saturation of the process gas flowing through a filter module or flowing out of the filter module.

It was mentioned that the filter body receiving room of a filter module housing of a respective filter module can be provided for receiving (only) a defined number of filter bodies configured with a defined geometry. In other words, a respective filter body receiving room can be configured with such a defined geometry, i.e., can have such a geometric structural design, that, with regard to the filter bodies that can be or are received therein, only the number of filter bodies configured with a defined geometry defined for the respective filter module can be received in it.

For example, a filter module housing or filter body receiving room can have a (hollow) cylindrical base shape with given dimensions, i.e., a given outside and inside radius and a given height; a respective filter body receiving room is configured with a defined geometry as a cylinder or hollow cylinder with given dimensions, in which, due to its geometrically defined configuration, only a defined number of filter bodies configured with a defined geometry, i.e., filter bodies with a ring-shaped or ring segment-shaped base shape, the outside and inside radius and height or total height of which are adapted to the dimensions of the filter body receiving room, can be received. Of course, the explanations apply analogously to filter module housings or filter body receiving rooms with a base shape different from a (hollow) cylinder.

Therefore, a respective filter body receiving room can have a spatially defined filter body receiving room volume ("volume") in which (only) the respective defined number of filter bodies configured with a defined geometry can be or is received. A defined number of filter bodies configured with a defined geometry is also understood to mean a number of one, i.e., a filter body receiving room can also receive only one (single) filter body configured with a defined geometry.

The filter module housings of the filter modules can differ in the respective defined number of filter bodies configured with a defined geometry that can be or are received in the respective filter body receiving rooms configured with a defined geometry comprised in the filter module housing. Therefore, the filter body receiving rooms of the respective filter module housings can differ in their respective filter body receiving volumes, wherein in every filter body receiving room only a defined number of filter bodies configured with a defined geometry can be received. Of course, it is also imaginable that the filter module housings of the filter modules do not differ in the respective defined number of filter bodies configured with a defined geometry that can be or are received in the respective filter body receiving rooms configured with a defined geometry comprised in the filter module housing. Therefore, the filter body receiving rooms of the respective filter module housings can be equal in their respective filter body receiving volumes, wherein in every filter body receiving room the same defined number of filter bodies configured with a defined geometry can be received.

Starting out from filter bodies with a specific geometrically defined configuration, a first filter module can comprise a filter body receiving room in which a first number of such filter bodies can be or is received, and a second (or further) filter module can comprise a filter body receiving room in which a second number, which is different from the first number, of such filter bodies can be or is received. For example, a first filter module can comprise a filter body receiving room in which only one single such filter body can be or is received, a second filter module can comprise a filter body receiving room in which, with regard to the filter body receiving room of the first filter module, at least one more such filter body can be or is received, a third filter module can comprise a filter body receiving room in which, with regard to the filter body receiving room of the second filter module, at least one more such filter body can be or is received, and so forth.

If several filter bodies are received in a filter body receiving room, these can be arranged, e.g., stack-type on top of each other. The filter bodies can be arranged aligned with each other. If the filter bodies have a ring-type or ring-shaped form, generally with an interior defined by the filter body, the respective interiors defined by the filter body can therefore be aligned with each other. As an alternative to a stack-type arrangement of respective filter bodies on top of each other, also a row-type arrangement of respective filter bodies next to each other is imaginable.

As mentioned, every filter module comprises (two) connection interfaces via which it can be or is connected to defined connection interfaces of the pipe structure of the apparatus if required. The filter modules associated with the filter device can therefore be exchanged if required—regardless of their respective degree of saturation—to ensure efficient operation of the filter device for a specific additive construction process. Thus, a filter device with a variably adaptable filter size is provided, which can be advantageous for efficient operation of the filter device, as filter modules with a comparably large or comparably small maximum filterable filter volume can be used if required. The filter size is conditional upon the use of different filter modules or the different number of filter bodies received in the filter body receiving rooms of the filter module housings of the respective filter modules.

Typically, only filter module housings with a specific geometrically defined configuration, especially a specific length, are connectible to or arrangeable on the connection interfaces of the pipe structure; therefore, typically only filter module housings with a specific geometrically defined configuration, especially a specific length, can be connected to the connection interfaces of the pipe structure. The filter modules associated with the filter device therefore advantageously have a respective geometrically defined configuration, especially a respective length. The geometrically defined configuration of the filter modules allows especially precisely fitting connection or precisely fitting arrangement of the filter modules to/on the connection areas of the pipe structure.

To ensure (position-)stable arrangement of respective filter bodies in respective filter body receiving rooms comprised in the filter module housing, the filter body/bodies received in a respective filter body receiving room can be received with a force or press fit in the respective filter body receiving room. The force or press fit can be established with a certain oversize of the filter bodies received in a respective filter body receiving room compared to the filter body receiving room.

Every filter module can comprise a closure device arranged or formed on the filter module housing. A respective filter module housing can have an access opening that can be closed with the respective closure device and forms an access option into the respective filter body receiving room. The interaction of the closure device and the access opening allows a possibly required, i.e., for example, for service purposes, exchange of a (or several) filter body/bodies received in a respective filter body receiving room.

The closure device can comprise a cap-like closing element, possibly arranged or formed movably on the filter module housing. The closing element can be movably (pivotingly) supported between an open position in which the closing element is moved relatively to the access opening such that accessing the filter body receiving room is possible, and a closed position in which the closing element is moved relatively to the access opening such that accessing the filter body receiving room is not possible. In the closed position, the closing element is typically moved relatively to the access opening, i.e., especially towards the access opening, such that the filter body receiving room is closed fluid-tightly.

In every filter module housing, a flow channel structure can be formed that can be or, during operation of the filter device, is flown through by the process gas or a process gas flow. The flow channel structure can comprise a first flow channel structure section comprising the, especially tubular, inflow section forming an inflow side for flowing process gas to be filtered or a process gas flow to be filtered into the filter module and a second flow channel structure section comprising the, especially tubular, outflow section forming an outflow side for flowing filtered process gas or a filtered process gas flow out of the filter module. The two flow channel structure sections communicate with each other. The filter body/bodies received in the respective filter body receiving room comprised in the filter module housing is/are arranged between the first and second flow channel structure section.

The invention is explained in more detail by means of exemplary embodiments in the drawings. In which FIG. 1 shows a schematic diagram of an apparatus according to an exemplary embodiment; and FIG. 2, 3 each show a schematic diagram of a filter module according to an exemplary embodiment.

FIG. 1 shows a schematic diagram of an apparatus 1 according to an exemplary embodiment. FIG. 1 only shows the section of the apparatus 1 relevant to explaining the principle described in the following in a sectional view.

The apparatus 1 serves for additive manufacturing of three-dimensional objects 2, i.e., especially technical components or technical component groups, by successive, selective layer-by-layer exposure and thus successive, selective layer-by-layer solidification of construction material layers of construction material 3 that can be solidified, i.e., for example, metal powder, by means of a laser beam 5. The selective solidification of respective construction material layers to be solidified is performed based on object-related construction data. Respective construction data describe the geometric or geometric structural design of the respective object 2 to be manufactured additively and can contain, for example, "sliced" CAD data of the object 2 to be manufactured. The apparatus 1 can be formed as a LaserCUSING® apparatus, i.e., as an apparatus for performing selective laser melting methods.

The apparatus 1 comprises the functional components required to perform additive construction processes, including a coating device 17 provided for forming construction material layers to be solidified selectively (in the construction plane of the apparatus 1) and an exposure device 4 provided for selectively exposing construction material layers to be solidified selectively (in the construction plane of the apparatus 1). The coating device 17 comprises several components (not shown in detail), namely a coating element that comprises an, especially blade-shaped, coating tool and a guiding device for guiding the coating element along a defined movement path. The exposure device 4 comprises several components as well (not shown in detail), namely a beam generation device for generating the laser beam 5, a beam deflection device for deflecting the laser beam 5 generated by the beam generation device onto an area to be exposed of a construction material layer to be solidified selectively, and diverse optical elements such as objective elements, lens elements, etc., which are typically arranged between the beam generation device and the beam deflection device.

The mentioned functional components of the apparatus 1 are arranged or formed on or in a process chamber 8 of the apparatus 1. The process chamber 8 is rendered inert, i.e., filled with inert gas such as argon, nitrogen, etc.

The apparatus 1 furthermore comprises a pipe structure 12 which can be or is flown through by process gas 9 arising in the course of performing additive construction processes in the process chamber 8, especially containing impurities arising related to the process. The flow of the process gas 9 through the process chamber 8, i.e., the process gas flow, is indicated by the arrows inside the process chamber 8. Respective impurities in the process gas 9 are especially smoke or smoulder particles arising related to the process and/or non-solidified construction material particles ("weld spatters"). The pipe structure 12 is connected via a pipe element (section) to an outflow section 10 of the process chamber 8, especially comprising an outflow opening, via which process gas 9 (to be filtered) can flow or flows from the process chamber 8 into the pipe structure 12, and via another pipe element (section) to an inflow section 11 of the process chamber 8, especially comprising an inflow opening, via which (filtered) process gas 9 can flow from the pipe structure 12 back into the process chamber 8. Apparently, a closed flow circuit is formed by the process chamber 8 and the pipe structure 12; hence, the process gas 9 flows between the process chamber 8 and the pipe structure 12 in a closed flow circuit.

Connected to the pipe or tube structure 12 is a filter device 7 and a pump device 13 provided for generating a suction flow that allows flowing of the process gas 9 through the pipe structure 12, i.e., also through the filter device 7.

The filter device 7 is provided for filtering the process gas 9 arising in the course of performing additive construction processes in a process chamber 8, especially containing impurities arising related to the process, and comprises several, i.e., at least two, filter modules 14. Every filter module 14 comprises a filter module housing 15. Every filter module housing 15 comprises an inflow section 26 forming an inflow side and an outflow section 27 forming an outflow side and a filter body receiving room 16 configured with a defined geometry arranged or formed between the inflow section 26 and the outflow section 27 (cf. FIG. 2, 3). A respective filter module 14 can form an assembly group that can be or is preconfigured and handled separately.

The filter modules 14 can be or are arranged exchangeably connected to the pipe structure 12 (if required), i.e., they can be arranged in the pipe structure 12 such that they are connected to the pipe structure 12 as shown in FIG. 1. A filter module 14 that is arranged connected to the pipe structure 12 can be flown through by the process gas 9 flowing through the pipe structure 12 and generally allows for filtering the process gas 9.

The filter modules 14 arranged connected to the pipe structure 12 can be switched separately, i.e., individually or in groups or collectively, via a switching device 29 assigned to the filter device 7 to a respective operating state in which the respective filter module 14 is connected to the pipe structure 12 such that it can be flown through by the process gas 9, and to a respective nonoperating state in which the respective filter module 14 is connected to the pipe structure 12 such that it cannot be flown through by the process gas 9. Hence, the switching device 29 comprises several, i.e., at least two, switch positions via which respective operating or nonoperating states of respective filter modules 14 can be implemented. Respective switch positions of the switching device 29 can be realized, for example, such that the process gas 9 flows in a first exemplary switch position through only one single filter module 14 and in a second exemplary switch position through at least two, possibly all, filter modules 14. Actual filtering of the process gas 9 is only possible with at least one filter module 14 arranged connected to the pipe structure 12 and switched to an operating state.

The option of individual switching of the filter modules 14 to respective operating and nonoperating states allows operation of the filter device 7 even while exchanging single filter modules 14, i.e., especially filter modules 14 with restricted filter capacity, e.g., due to a state of saturation, or in the case of failure of single filter modules 14. In this case, filtering of the process gas 9 is ensured by at least one further filter module 14 arranged connected to the pipe structure 12 and switched to an operating state. To exchange a filter module 14, it has to be switched to a nonoperating state via the switching device 29, wherein it is decoupled from the process gas flow flowing through the pipe structure 12 so that it can be easily removed from its arrangement connected to the pipe structure 12.

The switching device 29 is formed as a valve device (not denoted in more detail) comprising several valve units 30 (only adumbrated), e.g., formed as directional valves. Each valve unit 30 can be or is assigned to a filter module 14 that is arranged connected to the pipe structure 12 and can be controlled separately via a control device (not shown) associated with the switching device 29. Every valve unit 30 can be brought to a first switch position in which a filter module 14 assigned to the respective valve unit 30 can be flown through by the process gas 9, and to a second switch position in which a filter module 14 assigned to the respective valve unit 30 cannot be flown through by the process gas 9. The switch positions of a valve unit 30 are hence correlated with the operating or nonoperating state of the filter module 14 assigned to the valve unit 30, i.e., assigned to the operating or nonoperating state of the respective filter module 14. The switch positions of the switching device 29 can hence be implemented via respective switch positions of the valve units 30.

The pipe structure 12 comprises a connection device (not denoted in more detail) that comprises several connection interfaces 21, 22. Apparently, the filter modules 14 are arranged connected to the pipe structure 12 via a respective connection interface 21, 22. Hence, a respective connection interface 21, 22 is provided for arranging a filter module 14 connected to the pipe structure 12. Every connection interface 21, 22 is assigned a valve unit 30; therefore, every connection interface 21, 22 is equipped with a valve unit 30.

The filter modules 14 each comprise connection interfaces 19, 20 as well, via which they can be or are connected to respective connection interfaces 21, 22 of the connection device of the pipe structure 12 if required. The connection interfaces 21, 22 of the pipe structure can comprise connecting pieces comprising flange areas. The connection interfaces 19, 20 of the filter module, too, can comprise connecting pieces comprising flange areas. The connection interfaces of both the pipe structure and the filter module are configured identically; this facilitates any required replacement or, as explained further below, exchange of the filter modules 14.

The apparatus 1 can comprise a detection device 31 assigned to the filter device 7, provided for, especially automatable or automated, detection of saturation information describing a current and/or future degree of saturation of respective filter modules 14 arranged connected to the pipe structure 12. It is thus possible via the detection device 31 to detect a current and/or future degree of saturation of each filter module 14 so that a possibly required exchange of a filter module 14 can be performed early or timely.

The saturation information can describe a parameter dependent on the degree of saturation describing the degree or state of saturation of a filter module 14. A respective parameter can be, e.g., the weight of the filter module 14 dependent on the degree of saturation or a change in weight of the filter module 14 dependent on the degree of saturation, the pressure of the process gas 9 dependent on the degree of saturation or the differential pressure (pressure difference) of the process gas 9 dependent on the degree of saturation between the inflow section 26 of a filter module 14 and the outflow section 27 of the filter module 14, the flow rate of the process gas 9 dependent on the degree of saturation, especially compared to the capacity of the pump device 13 generating the process gas flow, through a filter module 14 or the flow rate difference dependent on the degree of saturation between the inflow section 26 and the outflow section 27 of the filter module 14, or the composition dependent on the degree of saturation of the process gas 9 flowing through a filter module 14 or flowing out of the filter module 14.

FIG. 2, 3 each show a schematic diagram of a filter module 14 according to an exemplary embodiment in a (longitudinal) sectional view.

From FIG. 2, 3 it can be seen that the filter body receiving room 16 of a filter module 14 can be provided for receiving (only) a defined number of filter bodies 18 configured with a defined geometry. A respective filter body receiving room 16 can be configured with such a defined geometry, i.e., can have such a geometric structural design, that, with regard to the filter bodies 18 that can be or are received therein, only the number of filter bodies 18 configured with a defined geometry defined for the respective filter module 14 can be received in it.

The filter modules 14 shown in FIG. 2, 3 each have a filter module housing 15 or a filter body receiving room 16 with a (hollow) cylindrical base shape with given dimensions, i.e., a given outside and inside radius and a given height. Due to their given dimensions, the respective filter body receiving rooms 16 are configured with a defined geometry. Due to their respective geometrically defined configuration, the filter body receiving rooms 16 can each receive only a defined number of filter bodies 18 configured with a defined geometry, i.e., in the exemplary embodiment filter bodies 18 with a ring-shaped base shape, the outside and inside radius and height or total height of which are adapted to the dimensions of the respective filter body receiving room 16.

In the filter body receiving room 16 of the filter module 14 shown in FIG. 2, five filter bodies 18 can be received exemplarily, whereas in the filter body receiving room 16 of the filter module 14 shown in FIG. 3, only one (single) filter body 18 can be received exemplarily.

The respective filter body receiving rooms 16 therefore have a spatially defined filter body receiving room volume in which (only) the respective defined number of filter bodies 18 configured with a defined geometry can be or is received. As results from FIG. 3, a defined number of filter bodies configured with a defined geometry is also understood to mean a number of one, i.e., a filter body receiving room 16 can also receive only one (single) filter body 18 configured with a defined geometry. It might also be imaginable to arrange in the exemplary embodiment shown in FIG. 2 one single elongated filter body 18 the height of which corresponds to the total height of the five individual filter bodies 18. Due to its comparably larger height, the elongated filter body 18 has a different geometrically defined configuration than the individual filter bodies 18.

Therefore, the filter module housings 15 of the filter modules 14 shown in FIG. 2, 3 differ in the respective defined number of filter bodies 18 configured with a defined geometry that can be or are received in the respective filter body receiving rooms 16 configured with a defined geometry comprised in the filter module housing. Hence, the filter body receiving rooms 16 of the respective filter module housings 15 differ in their respective filter body receiving volumes, wherein, as mentioned, in every filter body receiving room 16 only a defined number of filter bodies 18 configured with a defined geometry can be received.

From FIG. 2 it can be seen that, if several filter bodies 18 are received in a filter body receiving room 16, these can be arranged stack-type on top of each other. The, in this case, ring-shaped filter bodies 18 are arranged aligned with each other; the respective interiors defined by the filter body are aligned with each other. To ensure a (position-)stable arrangement of the filter bodies 18 in respective filter body receiving rooms 16, the filter bodies 18 are received with a force or press fit in the respective filter body receiving rooms 16.

Furthermore, in FIG. 2, 3 the connection interfaces 19, 20 of a filter module 14 can be seen, via which the filter module 14 can be or is connected to respective connection interfaces 21, 22 of the pipe structure if required. The connection interfaces 21, 22 of the pipe structure can comprise connecting pieces (not denoted in more detail) comprising flange areas. The filter modules 14 can therefore be exchanged if required to ensure efficient operation of the filter device 7 for a specific additive construction process. Thus, a filter device 7 with a variably adaptable filter size is provided. The filter size is conditional upon the use of different filter modules 14 or the different number of filter bodies 18 received in the filter body receiving rooms 16 of the filter module housings 15 of the respective filter modules 14.

Respective connection interfaces 19, 20 on the filter module comprise suitable fastening and sealing elements (not shown). Respective connection interfaces 19, 20 on the filter module, too, can be formed as connecting pieces comprising flange areas with respective fastening and sealing elements. Respective fastening elements can be provided for fastening a filter module 14 in a firm stabilized position to the connection areas 21, 22 of the apparatus. A fastening element can allow, e.g., form-locked and/or force-locked fastening of the filter module 7 to the connection interfaces 21, 22 of the pipe structure. A fastening element that allows form-locked and/or force-locked fastening of a filter module 7 to a connection interface 21, 22 of the pipe structure can be, e.g., a fastening or clamping clip. Respective fastening elements can therefore be, e.g., subring-type or full ring-type or -shaped fastening or clamping clips. Respective sealing elements can be, e.g., sealing rings.

The connection interfaces 19, 20 of all filter modules 14 are configured identically; this facilitates any required exchange of respective filter modules 14.

Apparently, in FIG. 2, 3, only filter modules 14 or filter module housings 15 with a specific geometrically defined configuration, especially a specific length, are connectible to the connection interfaces 21, 22 of the pipe structure; therefore, only filter modules 14 or filter module housings 15 with a specific geometrically defined configuration, especially a specific length, can be connected to the connection interfaces 21, 22 of the pipe structure. Therefore, the filter modules 14 have a respective geometrically defined configuration, especially a respective length, which allows a precisely fitting connection of the filter modules 14 to the connection interfaces 21, 22 of the pipe structure. The total length L of the filter modules 14 or filter module housings 15 shown in FIG. 2, 3 is identical.

From FIG. 2, 3 it can furthermore be seen that in every filter module housing 15, a flow channel structure 25 can be formed that can be or, during operation of the filter device 7, is flown through by the process gas 9 or the process gas flow. The flow channel structure 25 comprises a first flow channel structure section 25a comprising the tubular inflow section 26 for flowing the process gas 9 to be filtered or a process gas flow to be filtered into the filter module 14 and a second flow channel structure section 25b comprising the tubular outflow section 27 for flowing the filtered process gas 9 or the filtered process gas flow out of the filter module 14. The two flow channel structure sections 25a, 25b communicate with each other. The filter body/bodies 18 received in the respective filter body receiving room 16 is/are arranged between the first and second flow channel structure section 25a, 25b. In the first flow channel structure section 25a, an exemplarily conical flow guidance element 28 is furthermore arranged, which purposefully guides the process gas 9 to be filtered to the filter bodies 18.

FIG. 2, 3 furthermore show that every filter module 14 can optionally comprise a closure device 23 arranged or formed on the filter module housing. The respective filter module housings 15 have an access opening (not denoted in more detail) that can be closed with the respective closure device 23 and forms an access option into the respective filter body receiving room 16. The interaction of the closure device 23 and the access opening allows a possibly required, i.e., for example, for service purposes, exchange of a (or several) filter body/bodies 18.

The closure device 23 comprises a cap-like closing element 24, possibly arranged or formed movably on the filter module housing 15. In the exemplary embodiments shown in FIG. 2, 3, the closing element 24 is formed by a part of the first flow channel structure section 25a comprising the tubular inflow section 26.

The closing element 24 is movably (pivotingly) supported between an open position in which the closing element 24 is moved relatively to the access opening such that accessing the filter body receiving room 16 is possible, and a closed position shown in FIG. 2, 3 in which the closing element 24 is moved relatively to the access opening such that accessing the filter body receiving room 16 is not possible. In the closed position, the closing element 24 is typically moved relatively to the access opening, i.e., especially towards the access opening, such that the filter body receiving room 16 is closed fluid-tightly.

The invention claimed is:

1. An apparatus for additive manufacturing of three-dimensional objects by successive, selective layer-by-layer exposure and thus successive, selective layer-by-layer solidification of construction material layers of construction material with an energy beam, comprising:
   a pipe structure that comprises at least one pipe element through which process gas can be flown, the process gas arising in the course of performing additive construction processes in a process chamber of the apparatus, the process gas containing impurities arising related to the process;
   a filter device connected to the pipe structure, the filter device provided for filtering the process gas, wherein the filter device comprises:
      a first filter module exchangeably connected or connectable to the pipe structure and having a total length between its opposed connection interfaces corresponding to a distance between opposed connection areas of the pipe structure, the first filter module having a first filter body receiving room with a first filter body receiving room length being a component of the total length, the first filter body receiving room configured for receiving a first number of a defined filter body; and
      a second filter module exchangeably connected or connectable to the pipe structure and having said total length, the second filter module having a second filter body receiving room with a second filter body receiving room length being a component of the total length and greater than the first filter body receiving room length, the second filter body receiving room configured for receiving a second number of the defined filter body, the second number being greater than the first number; and
   a switching device assigned to the filter device, the switching device operable to individually switch respective ones of the first and second filter modules between an operating state comprising the respective filter module connected to the pipe structure such that process gas can be flown therethrough and a nonoperating state comprising the respective filter module connected to the pipe structure such that process gas cannot be flown therethrough.

2. The apparatus according to claim 1, wherein the switching device is formed as or comprises a valve device, the valve device comprising a plurality of valve units, respective ones of the valve units of the valve device being assigned to a filter module that is arranged connected to the pipe structure.

3. The apparatus according to claim 1, wherein the pipe structure comprises a connection device that comprises a plurality of connection areas, wherein respective ones of the plurality of filter modules can be arranged connected to the pipe structure via corresponding respective ones of the plurality of connection interfaces, and wherein corresponding respective ones of the plurality of connection interfaces are each spaced apart by a distance corresponding to the total length of the filter modules.

4. The apparatus according to claim 3, comprising respective pairs of the plurality of connection interfaces being assigned to corresponding respective ones of the plurality of valve units.

5. The apparatus according to claim 1, comprising:
   a detection device assigned to the filter device, the detection device provided for detecting saturation information describing a degree of saturation of at least one filter module connected to the pipe structure.

6. The apparatus according to claim 5, wherein the saturation information describes a parameter dependent on the degree of saturation of a filter module of the plurality of filter modules, wherein the parameter comprises:
   a weight of the filter module or a change in weight of the filter module,
   a pressure of the process gas or the pressure difference of the process gas between an inflow section of the filter module forming an inflow side and an outflow section of the filter module forming an outflow side,
   a flow rate of the process gas through the filter module or a flow rate difference between an inflow section of the filter module forming an inflow side and an outflow section of the filter module forming an outflow side, or
   a composition of the process gas flowing through the filter module or flowing out of the filter module.

7. The apparatus according to claim 1, wherein a respective filter module forms an assembly group that can be or is preconfigured and handled separately.

8. The apparatus according to claim 1, wherein the connection interfaces of respective ones of the filter modules are configured identically.

9. The apparatus according to claim 1, wherein only filter module housings with a specific geometrically defined configuration comprising a specific length can be connected to the connection areas of the apparatus, wherein respective ones of the filter modules of the filter device have a respective geometrically defined configuration comprising a respective length.

10. The apparatus according to claim 1, wherein the filter body/bodies received in a respective filter body receiving room comprised in the filter module housing is/are received with a press fit in the respective filter body receiving room.

11. The apparatus according to claim 1, wherein respective ones of the filter modules comprise a closure device arranged or formed on the filter module housing, wherein a respective filter module housing has an access opening that can be closed with the respective closure device and forms an access option into the respective filter body receiving room.

12. The apparatus according to claim 1, wherein the filter module housing comprises a flow channel structure through which the process gas is or can be flown, wherein the flow channel structure comprises a first flow channel structure section that comprises an inflow section for flowing the process gas to be filtered into the filter module and a second flow channel structure section that comprises an outflow section for flowing filtered process gas out of the filter module, wherein the filter body/bodies received in the respective filter body receiving room comprised in the filter module housing is/are arranged between the first and second flow channel structure section.

13. The apparatus according to claim 5, comprising the flow rate of the process gas through the filter module being as compared to the capacity of a flow generation device generating the process gas flow.

14. An apparatus for additive manufacturing of three-dimensional objects by successive, selective layer-by-layer exposure and successive, selective layer-by-layer solidification of layers of construction material with an energy beam, comprising:
   a pipe structure that comprises:

at least one pipe element, through which a process gas arising in the course of performing additive construction processes in a process chamber can flow; and
a connection device comprising a plurality of connection areas; and
a filter device connected to the pipe structure, the filter device provided for filtering the process gas, wherein the filter device comprises:
a first filter module exchangeably connected or connectable to the connection device of the pipe structure and having a total length between its opposed connection interfaces corresponding to a distance between opposed connection areas of the pipe structure, the first filter module having a first filter body receiving room with a first filter body receiving room length being a component of the total length, the first filter body receiving room configured for receiving a first number of a defined filter body; and
a second filter module exchangeably connected or connectable to the connection device of the pipe structure and having said total length, the second filter module having a second filter body receiving room with a second filter body receiving room length being a component of the total length and greater than the first filter body receiving room length, the second filter body receiving room configured for receiving a second number of the defined filter body, the second number being greater than the first number;
wherein the first and second filter modules can be switched individually via a switching device assigned to the filter device between:
an operating state comprising a respective filter module connected to the pipe structure such that the process gas can flow therethrough; and
a nonoperating state comprising a respective filter module connected to the pipe structure such that the process gas cannot flow therethrough.

15. The apparatus according to claim 14, wherein the plurality of connection interfaces is configured for precisely fitting the specific length of the filter module housings.

16. The apparatus according to claim 15, wherein the switching device is formed as or comprises a valve device, the valve device comprising a plurality of valve units, respective pairs of the plurality of valve units of the valve device being assigned to a filter module that is arranged connected to the pipe structure.

17. The apparatus according to claim 16, comprising respective ones of the plurality of connection interfaces being assigned to corresponding respective ones of the plurality of valve units.

18. The apparatus according to any claim 14, further comprising:
a detection device assigned to the filter device, the detection device provided for detecting saturation information describing a degree of saturation of at least one of the plurality of filter modules.

19. The apparatus according to claim 18, wherein the saturation information comprises one or more of:
a weight or a change in weight of the at least one of the plurality of filter modules,
a pressure or a pressure difference of the process gas between an inflow section and an outflow section of at least one of the plurality of filter modules,
a flow rate of the process gas flowing through the at least one of the plurality of filter module or a difference in flow rate of the process gas between an inflow section an outflow section of the at least one of the plurality of filter modules forming an outflow side, or
a composition of the process gas flowing through or out of the at least one of the plurality of filter modules.

* * * * *